(12) United States Patent
Lacagnina et al.

(10) Patent No.: US 8,876,997 B2
(45) Date of Patent: Nov. 4, 2014

(54) METHOD AND APPARATUS FOR MANUFACTURING TYRES FOR VEHICLE WHEELS

(75) Inventors: Claudio Lacagnina, Milan (IT); Luigi Braghieri, Santo André (BR)

(73) Assignee: Pirelli Tyre S.p.A., Milan (IT)

( * ) Notice: Subject to any disclaimer, the term of this patent is extended or adjusted under 35 U.S.C. 154(b) by 1020 days.

(21) Appl. No.: 10/593,148

(22) PCT Filed: Mar. 31, 2004

(86) PCT No.: PCT/IT2004/000160
§ 371 (c)(1),
(2), (4) Date: Jun. 19, 2007

(87) PCT Pub. No.: WO2005/095092
PCT Pub. Date: Oct. 13, 2005

(65) Prior Publication Data
US 2008/0087367 A1    Apr. 17, 2008

(51) Int. Cl.
B29D 30/26 (2006.01)
B29D 30/20 (2006.01)

(52) U.S. Cl.
CPC ............ B29D 30/2607 (2013.01); B29D 30/20 (2013.01)
USPC ........... 156/111; 156/117; 156/126; 156/130; 156/130.3; 156/396; 156/397; 156/406.2; 156/415; 156/416

(58) Field of Classification Search
USPC .............. 156/111, 117, 126, 127, 130, 130.3, 156/396, 397, 406.2, 414, 415, 416; 152/532
See application file for complete search history.

(56) References Cited

U.S. PATENT DOCUMENTS

| | | | |
|---|---|---|---|
| 3,143,450 A * | 8/1964 | Barber et al. | 156/126 |
| 3,784,426 A | 1/1974 | Woodhall et al. | |
| 3,844,871 A | 10/1974 | Habert et al. | |
| 3,990,931 A | 11/1976 | Leblond et al. | |
| 4,288,265 A * | 9/1981 | Pacciarini et al. | 156/126 |

(Continued)

FOREIGN PATENT DOCUMENTS

| | | |
|---|---|---|
| EP | 0 433 974 A2 | 6/1991 |
| EP | 0 613 757 A1 | 9/1994 |

(Continued)

OTHER PUBLICATIONS

Office Action issued by Japan Patent Office in corresponding Patent Application No. JP 2007-505742 on Jan. 5, 2010 (4 pages).

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

In the field of tire building, underbelt inserts are applied to an expandable support associated with an auxiliary drum on which the belt structure is made, simultaneously with manufacture of a carcass structure on a primary drum. Following expansion of the expandable support, the underbelt inserts are applied to the belt structure that can be directly made on the support itself in an expanded condition. The belt structure together with the underbelt inserts and a tread band are then transferred onto the carcass structure formed on the primary drum to complete building of the tire following shaping of the carcass into a toroidal conformation.

23 Claims, 7 Drawing Sheets

(56) References Cited

U.S. PATENT DOCUMENTS

| | | | |
|---|---|---|---|
| 4,392,899 A | | 7/1983 | Bertoldo |
| 4,507,006 A | | 3/1985 | Golob et al. |
| 4,555,287 A | * | 11/1985 | Goodfellow ................. 156/127 |
| 4,561,927 A | * | 12/1985 | Sumner ..................... 156/406.2 |
| 4,738,738 A | * | 4/1988 | Holroyd et al. ............... 156/129 |
| 5,201,975 A | * | 4/1993 | Holroyd et al. ............... 156/124 |
| 5,215,612 A | * | 6/1993 | Motomura et al. ......... 156/130.7 |
| 5,248,357 A | * | 9/1993 | Miyanaga et al. .......... 156/128.1 |
| 5,407,006 A | | 4/1995 | Giancola et al. |
| 5,853,525 A | | 12/1998 | Irie |
| 5,861,079 A | | 1/1999 | Morteyrol |
| 6,576,077 B1 | * | 6/2003 | Mitsuhashi et al. ........... 156/117 |
| 2002/0153083 A1 | * | 10/2002 | Takagi ........................ 156/121 |

FOREIGN PATENT DOCUMENTS

| | | |
|---|---|---|
| EP | 0 613 767 A2 | 9/1994 |
| GB | 932792 | 7/1963 |
| GB | 997253 | 7/1965 |
| GB | 2 031 818 A | 4/1980 |
| GB | 2 133 357 A | 7/1984 |
| JP | 04-219225 | 8/1992 |
| JP | 2004-017621 | 1/2004 |
| RU | 2 225 792 C2 | 3/2004 |
| SU | 540559 | 2/1973 |
| SU | 701026 A1 | 1/1991 |
| WO | WO 00/03867 | 1/2000 |
| WO | WO 01/08874 A1 | 2/2001 |

OTHER PUBLICATIONS

English-language translation of Office Action issued by Japan Patent Office in corresponding Patent Application No. JP 2007-505742 on Jan. 5, 2010 (4 pages).

First Examination Report issued Oct. 16, 2012 by the Indian Patent Office on corresponding Patent Application No. 4521/DELNP/2006 (2 pages).

Notification of the First Office Action issued by The Patent Office of the People's Republic of China in corresponding China Patent Application No. 200480042250.6 on Jun. 13, 2008 (9 pages).

English-language translation of Notification of the First Office Action issued by The Patent Office of the People's Republic of China in corresponding China Patent Application No. 200480042250.6 on Jun. 13, 2008 (12 pages).

Notice of Preliminary Rejection issued by Korean Patent Office in corresponding Korean Patent Application No. 10-2006-7020136 on Sep. 27, 2010 (4 pages).

English-language translation of Notice of Preliminary Rejection issued by Korean Patent Office in corresponding Korean Patent Application No. 10-2006-7020136 on Sep. 27, 2010 (3 pages).

Office Action issued by Patent Office of the Russian Federation in corresponding Russian Patent Application No. 2006134634/12(037685), 2008 (4 pages).

English-language translation of Office Action issued by Patent Office of the Russian Federation in corresponding Russian Patent Application No. 2006134634/12(037685), 2008 (2 pages).

English-language translation of Decision on Grant issued by Patent Office of the Russian Federation in corresponding Russian Patent Application No. 2006134634/12(037685), 2008 (5 pages).

* cited by examiner

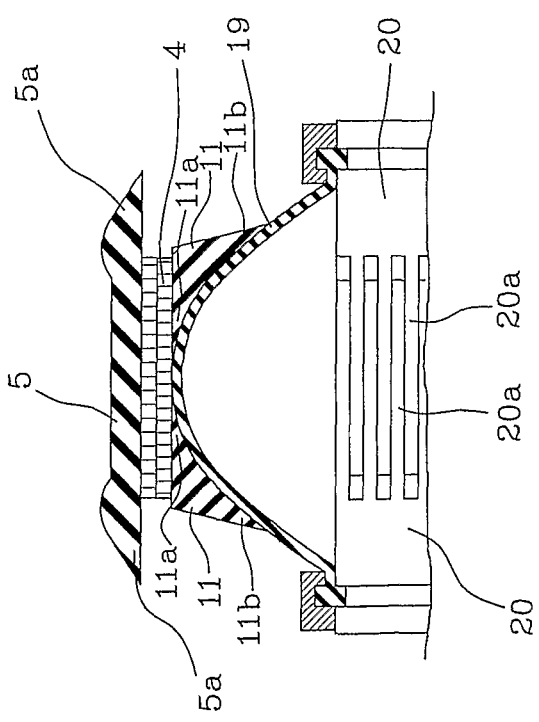
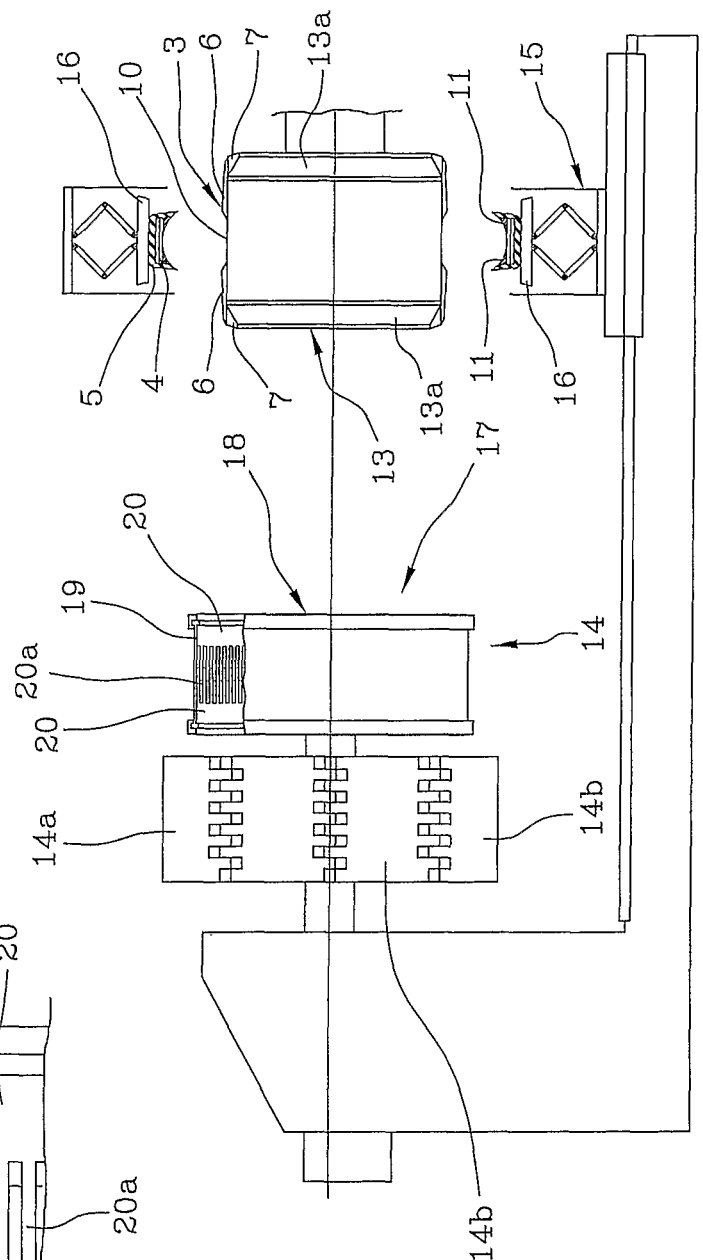

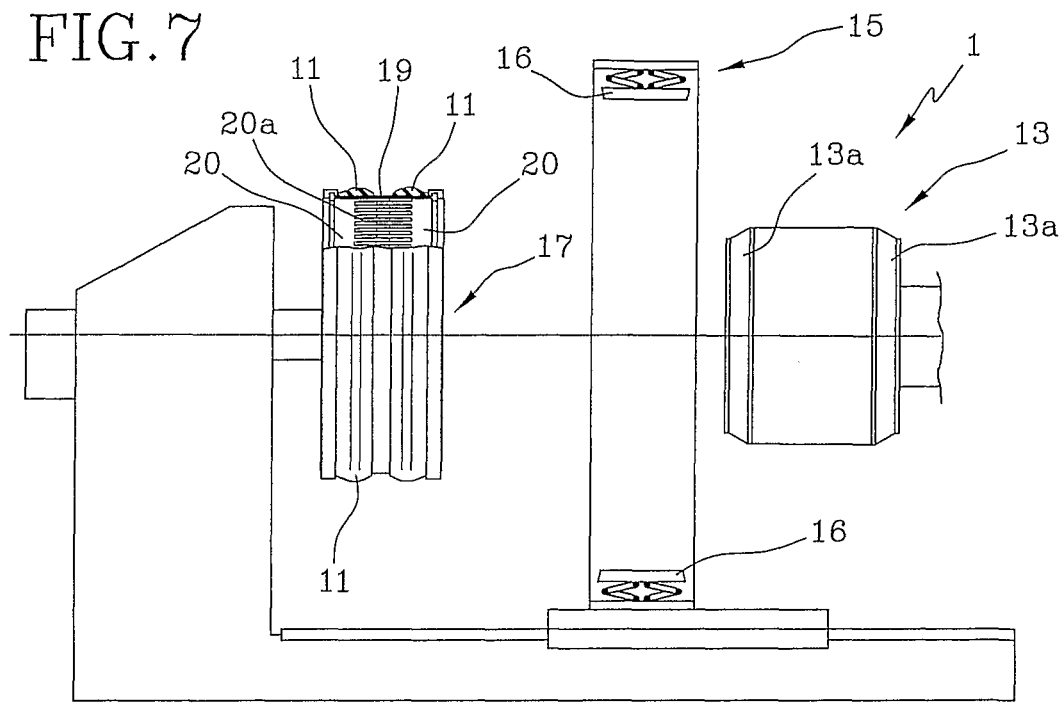
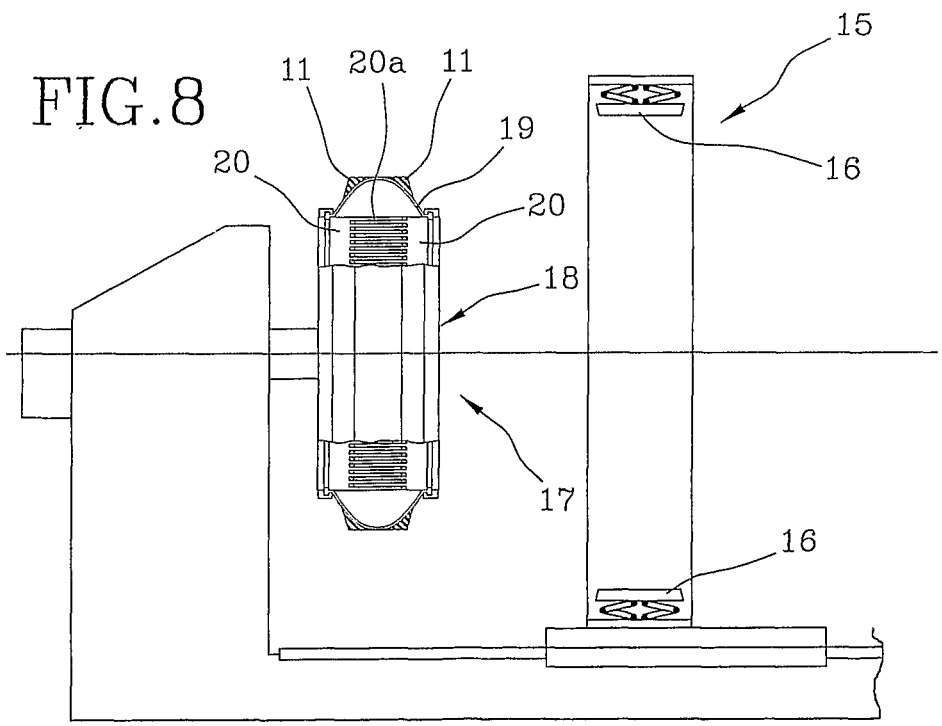

METHOD AND APPARATUS FOR MANUFACTURING TYRES FOR VEHICLE WHEELS

CROSS REFERENCE TO RELATED APPLICATION

This application is a national phase application based on PCT/IT2004/000160, filed Mar. 31, 2004, the content of which is incorporated herein by reference.

BACKGROUND OF THE INVENTION

1. Field of the Invention

The present invention relates to a method of manufacturing tyres for vehicle wheels.

The invention also relates to an apparatus for manufacturing tyres for vehicle wheels.

2. Description of the Related Art

A tyre for vehicle wheels generally comprises a carcass structure comprising at least one carcass ply having respectively opposite end flaps looped back around annular anchoring structures, usually each formed of a substantially circumferential inner insert onto which at least one filling insert is applied, at a radially external position.

Associated with the carcass structure is a belt structure comprising one or more belt layers placed in radial superposed relationship with respect to each other and the carcass ply and having textile or metallic reinforcing cords with a crossed orientation and/or substantially parallel to the circumferential extension direction of the tyre. At a radially external position to the belt structure a tread band is applied which is made of elastomer material like other semifinished products constituting the tyre.

It is to be herein pointed out, to the aims of the present description, that by the term "elastomer material" it is intended a composition comprising at least one elastomer polymer and at least one reinforcing filler. Preferably, this composition further comprises additives such as cross-linking agents and/or plasticizers. Due to the presence of cross-linking agents, this material can be cross-linked through heating so as to form the final article of manufacture.

Also applied to the side surfaces of the carcass structure, each extending from one of the side edges of the tread band until close to the respective annular anchoring structure to the beads, are respective sidewalls of elastomer material that, depending on the different embodiments, can have respective radially external end edges that are superposed on the side edges of the tread band to form a design scheme of the type usually called "overlying sidewalls", or interposed between the carcass structure and the side edges of the tread band itself, in accordance with a design scheme of the type referred to as "underlying sidewalls".

In most of the known processes for tyre manufacture, the carcass structure and belt structure are provided to be made separately of each other in respective work stations, to be mutually assembled at a later time.

More particularly, manufacture of the carcass structure first contemplates deposition of the carcass ply or plies on a first drum usually identified as "building drum" to form a cylindrical sleeve. The annular anchoring structures to the beads are fitted or formed on the opposite end flaps of the carcass ply or plies that in turn are turned up around the annular structures themselves so as to enclose them in a sort of loop.

Simultaneously, on a second drum or auxiliary drum, an outer sleeve is made which comprises the belt layers laid down in radially superposed relationship with each other (and optionally the tread band applied to the belt layers at a radially external position). The outer sleeve is then picked up from the auxiliary drum to be coupled with the carcass sleeve. For the purpose, the outer sleeve is disposed in coaxial relation around the carcass sleeve, and afterwards the carcass ply or plies are shaped into a toroidal conformation by axially moving the beads close to each other and simultaneously admitting fluid under pressure into the carcass sleeve, so as to determine application of the belt ring (and optionally of the tread band) to the carcass structure of the tyre at a radially external position thereof. Assembling of the carcass sleeve with the outer sleeve can be carried out on the same drum as used for building the carcass sleeve, in which case reference is made to a "unistage building process". A building process of this type is described in document U.S. Pat. No. 3,990,931, for example.

In manufacturing some particular tyre types, such as in the case of tyres for lorries and the like, application of so-called "underbelt inserts" interposed between the carcass structure and belt structure is provided.

Here and in the following of the specification and claims, by the term "underbelt insert" it is intended a substantially circumferential insert preferably of elastomer material that is interposed between the carcass structure and belt structure of the tyre; these inserts are preferably present in pairs and each insert is positioned close to each tyre shoulder.

For manufacture of the underbelt inserts, one or more lengths of appropriate cross-section conformation, cut from a continuous strip of extruded elastomer material are circumferentially applied to the cylindrical sleeve formed on the building drum. During the shaping step of the carcass structure for coupling with the belt structure, the underbelt inserts are submitted to a circumferential stretching action imposed by the expansion of the carcass structure, and they modify their orientation in such a manner that, at the end of the shaping step, they form a substantially continuous surface with a radially external portion of the carcass ply, which surface is adapted to evenly bear against the radially internal surface of the belt structure.

Also known are building processes of the so-called "two-stage" type in which, as described in document EP 0 613 757 for example, assembling between the carcass structure and belt structure is carried out on a so-called shaping drum onto which the carcass sleeve picked up from the building drum and, subsequently, the outer sleeve picked up from the auxiliary drum are transferred.

In document WO 01/08874, in the name of the same Applicant, it is described a shaping drum to be used in a two-stage building process and set to facilitate application of the underbelt inserts to the carcass sleeve, before carrying out the shaping step.

Document U.S. Pat. No. 4,392,899, also in the name of the same Applicant, discloses an auxiliary drum such conceived as to obtain a reduction in the required time for assembling the belt structure and tread band on the auxiliary drum.

In accordance with the present invention, the Applicant however realised that important improvements to the production methods of the known art can be made both in terms of productivity and in terms of quality of the obtained product.

In this connection, it could be noticed that for the operations to be executed at a primary building and/or shaping drum for the purpose of making the carcass structure, a higher cycle-time is required as compared with the time required for the operations carried out on the auxiliary drum to make the belt structure and possibly the tread band. In more detail, the Applicant has ascertained that one of the causes leading to an increase in the overall cycle time, i.e. the time required for completing the building cycle of the tyre, as well as leading to geometrical faults of the tyre structure that can adversely affect the quality of the finished product, resides in the necessity to make the underbelt inserts on the carcass structure.

SUMMARY OF THE INVENTION

In accordance with the present invention, thus the Applicant realised that considerable advantages in terms of productivity and quality of the finished product could be achieved if the underbelt inserts were coupled with the belt structure before assembling the latter to the carcass structure, thereby reducing both the building time on the primary drum and the waiting time, on the auxiliary drum, of the tyre components assembled therein.

In accordance with the present invention, there is provided a method of manufacturing tyres for vehicle wheels, comprising the steps of:
  disposing a carcass structure comprising at least one carcass ply on a primary drum;
  assembling a belt structure comprising at least one belt layer on an auxiliary drum;
  picking up the belt structure from the auxiliary drum; and transferring the belt structure to a coaxially centered position relative to the carcass structure;
  shaping the carcass structure into a toroidal configuration to engage the belt structure with the carcass structure;
  wherein during said step of assembling said belt structure, at least one underbelt insert is associated with said at least one belt layer at a radially internal position.

In one embodiment, the association of said at least one underbelt insert with the belt structure comprises the steps of:
  applying said at least one underbelt insert onto an expandable support; and
  radially expanding the expandable support to mutually join the belt structure to said at least one underbelt insert.

Another embodiment of the present invention further comprises the step of applying a tread band around the belt structure disposed on the auxiliary drum. The tread band can be applied through spiraling of at least one elongated element of elastomer material.

Still another embodiment further comprises the step of applying a tread band at a radially external position to the belt structure that is assembled to a tyre under working shaped into a toroidal conformation, through spiraling of at least one elongated element of elastomer material.

In accordance with the present invention, there is also provided an apparatus for manufacturing tyres for vehicle wheels comprising:
  a primary drum set to support a carcass structure comprising at least one carcass ply;
  an auxiliary drum having an abutment surface set to support a belt structure;
  a transfer member movable between the primary drum and auxiliary drum;
  gripping devices associated with the transfer member to pick up the belt structure from the auxiliary drum; and
  devices for application of at least one underbelt insert to said belt structure when the latter is at a position axially spaced apart from the carcass structure.

In one embodiment, the application devices of the apparatus comprise:
  an expandable support;
  devices for winding of the underbelt inserts on the expandable support; and
  actuator members to radially expand the expandable support between a first operating condition at which said support has a reduced diameter and a second operating condition at which it has an increased diameter.

In another embodiment, the apparatus further comprises pressing members operating on the expandable support to cause pressing of the belt structure against said at least one underbelt insert. The apparatus of the present invention can also further comprise devices for application of a tread band to the belt structure at a radially external position and can also further comprising bending devices operating on the expandable support to bend end flaps of the tread band against axially external portions of said at least one underbelt insert associated with the belt structure.

BRIEF DESCRIPTION OF THE DRAWINGS

Further features and advantages will become more apparent from the detailed description of a preferred, but not exclusive, embodiment of a method and an apparatus for manufacturing tyres for vehicle wheels in accordance with the present invention.

This description will be set out hereinafter with reference to the accompanying drawings, given by way of non-limiting example, in which:

FIG. 3a is an enlarged detail of FIG. 3;

FIG. 4a is an enlarged-detail of FIG. 4;

FIG. 6 shows transfer of the belt structure provided with underbelt inserts at a position coaxial with a carcass sleeve previously formed on a building drum;

FIG. 7 diagrammatically shows an apparatus for manufacturing tyres in accordance with an alternative embodiment of the present invention, when manufacture of the underbelt inserts has been completed;

FIG. 8 diagrammatically shows the apparatus in FIG. 7 during expansion of an expandable support;

DETAILED DESCRIPTION OF THE INVENTION

Figure 1:
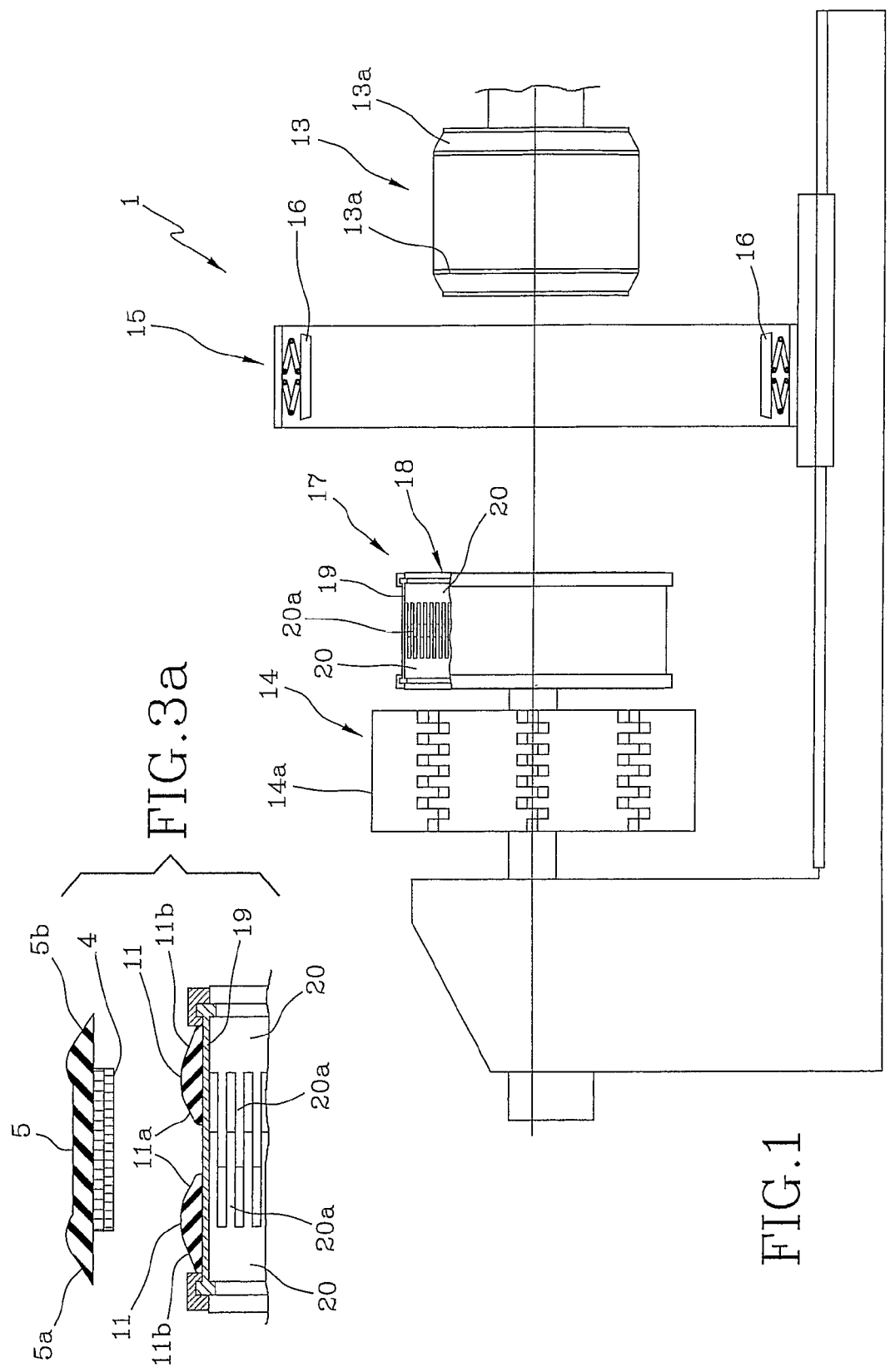
FIG. 1 diagrammatically shows a side view partly in section of an apparatus for manufacturing tyres in accordance with a first embodiment of the present invention.

Referring particularly to FIGS. 1 to 10, an apparatus for manufacturing tyres for vehicle wheels set to put into practice a method in accordance with the present invention has been generally identified by reference numeral 1.

Figure 11:
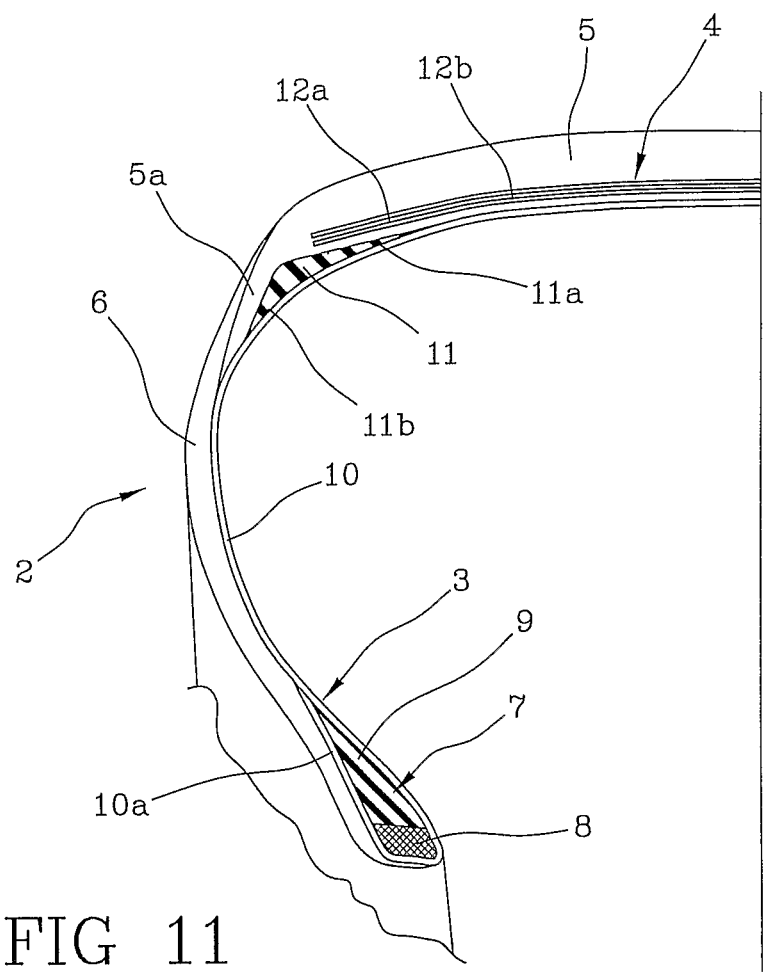
FIG. 11 is a diagrammatic interrupted cross-section of a tyre obtainable in accordance with the present invention.

The invention aims at manufacturing tyres of the type generally denoted at 2 in FIG. 11, in particular for lorries, essentially comprising a carcass structure 3 of substantially toroidal conformation, a belt structure 4 of a substantially cylindrical conformation and circumferentially extending around the carcass structure 3, a tread band 5 applied to the belt structure 4 at a circumferentially external position, and a pair of sidewalls 6 laterally applied to the carcass structure 3 on opposite sides and each extending until close to a radially internal edge of the carcass structure itself.

The carcass structure 3 comprises a pair of annular anchoring structures 7, integrated into regions usually identified as "beads" and each of them for example consisting of a substantially circumferential annular insert 8, usually called "bead core", carrying an elastomer filler 9 at a radially external position.

Turned up around each of the annular anchoring structures are the end flaps 10a of one or more carcass plies 10 comprising textile or metallic cords extending transversely of the circumferential extension of tyre 2, optionally with a predetermined inclination, from one of the annular anchoring structures 7 to the other.

Also provided are auxiliary inserts 11, of the type usually called "underbelt inserts" for example, that are applied between the carcass structure 3 and belt structure 4, each of them close to one of the axially opposite edges 4a of the belt structure itself. Each underbelt insert 11 has an axially internal portion 11a interposed between the carcass ply 10 and belt structure 4 and tapering towards an equatorial plane of tyre 2, and an axially external portion 11b interposed between the carcass ply 10 and a respective sidewall 6, and tapering towards the rotation axis of tyre 2.

The belt structure 4 can in turn comprise one or more belt layers 12a, 12b comprising metallic or textile cords that are suitably inclined to the circumferential extension of tyre 2, following respectively crossed orientations between one belt layer and the other, as well as an optional external belting layer (not shown), generally called a 0-degree layer, which comprises one or more cords circumferentially wound up into coils disposed in axial side-by-side relationship around the belt layers 12a, 12b. Each of the sidewalls 6 and the tread band 5 essentially comprise at least one layer of elastomer material of appropriate thickness. Also associated with the tread band 5 can be a so-called under-layer (not shown), of elastomer material having appropriate composition and physico-chemical features, which acts as an interface between the true tread band 5 and the underlying belt structure 4.

The individual components of the carcass structure 3 and belt structure 4, such as in particular the annular anchoring structures 7, carcass plies 10, belt layers 12a, 12b and further possible reinforcing elements designed to constitute the above mentioned outer belting layer, are supplied to apparatus 1 in the form of semi-finished products produced during prior working steps, in order to be suitably assembled with each other.

Apparatus 1 comprises a primary drum 13 on which assembling of at least part of the components designed to form the carcass structure 3 of tyre 2 is carried out.

In more detail, the primary drum 13 is adapted to support at least the carcass ply 10 fed in the form of a strip from a respective feeding unit, not shown as it can be made in a manner known by itself.

The carcass ply 10 is disposed on the primary drum 13 through a winding operation carried out around the drum itself so as to form a cylindrical sleeve on the opposite end flaps of which the annular anchoring structures 7 are then fitted. Turning-up of the end flaps 10a of the carcass ply 10 around the annular anchoring structures 7 can be carried out subsequently. Also provided may be application of the sidewalls 6 on the primary drum 3, preferably carried out before application of the carcass ply and concurrently with the optional application of a radially internal elastomer layer usually called "liner".

Apparatus 1 further comprises an auxiliary drum 14, preferably aligned in coaxial relationship relative to the primary drum 13 and having a plurality of radially movable circumferential sectors 14b externally defining, when in an expanded position, an abutment surface 14a adapted to support the belt structure 4.

In more detail, the belt structure 4 is obtained through winding of one or more belt layers on the auxiliary drum 14; these belt layers, denoted at 12a, 12b in FIG. 11 by way of example, are each formed of a semi-finished product in the form of a strip coming from suitable feeding units, also not shown because they can be made in known manner.

Figure 2:
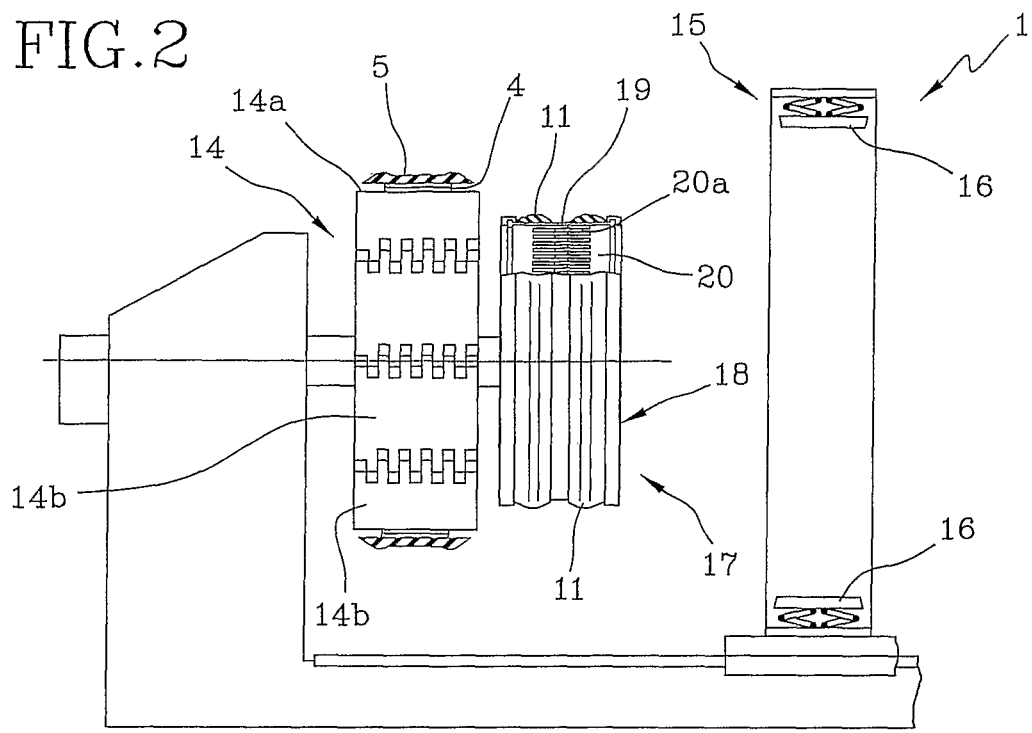
FIG. 2 shows the apparatus seen in FIG. 1 at the end of manufacture of a belt structure and of elongated underbelt elements.
Figure 9:
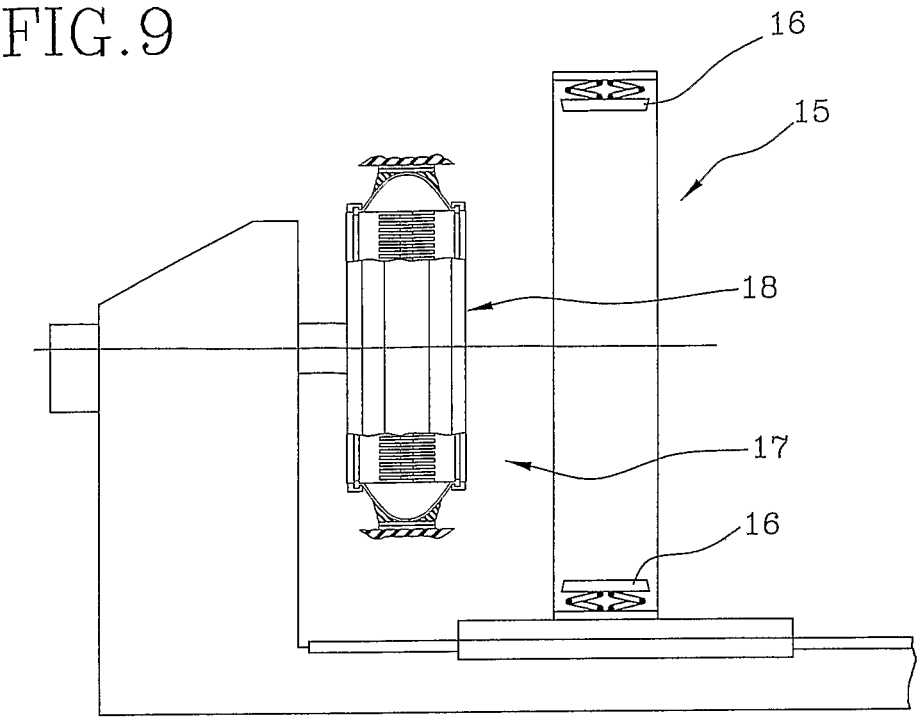
FIG. 9 diagrammatically shows the apparatus in FIG. 7 after application of the belt structure and tread band.
Figure 10:
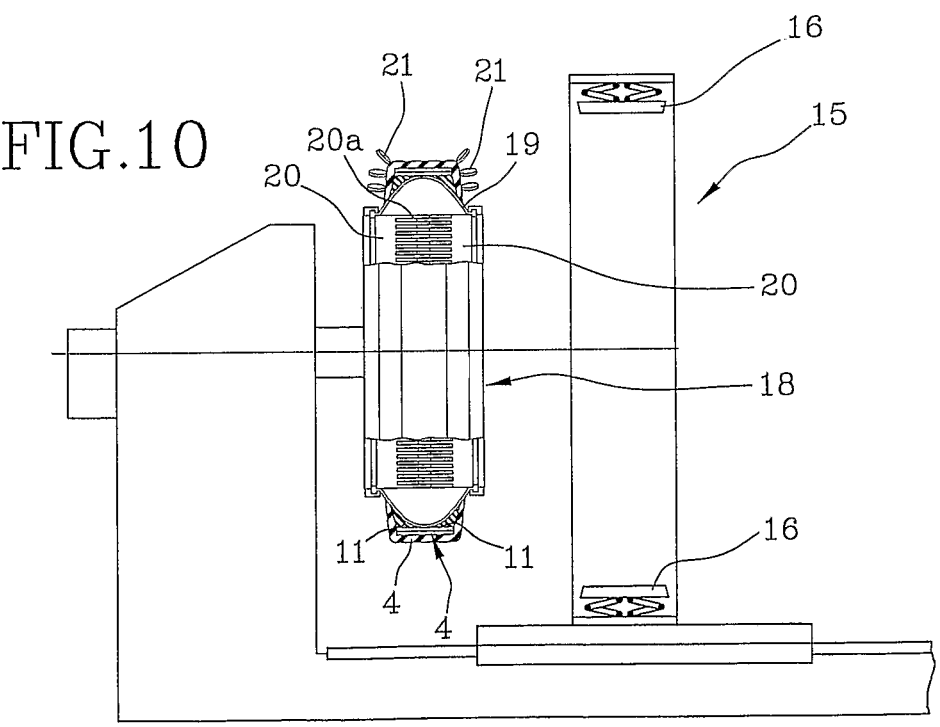
FIG. 10 shows the apparatus in FIG. 7 during a rolling step of the tread band.

Also interlocked with the auxiliary drum 14 can be a further feeding unit, set to supply a strip length of elastomer material of suitable cross-section, that is applied to the belt structure at a radially external position, to form the tread band 15 as shown in FIGS. 2 and 9.

Alternatively, it may be also provided that the tread band 5 be made by carrying out spiraling of at least one preferably continuous elongated element of elastomer material, i.e. by winding said elongated element supplied from an appropriate feeding unit such as an extruder, into substantially circumferential coils.

Winding takes place at a position radially external to the belt structure 4 assembled on the auxiliary drum 14 which is maintained in rotation, while a controlled axial movement of the auxiliary drum itself and/or the unit supplying the elongated element causes distribution of the coils in a manner adapted to give the thread band 5 the desired final conformation.

Figure 5:
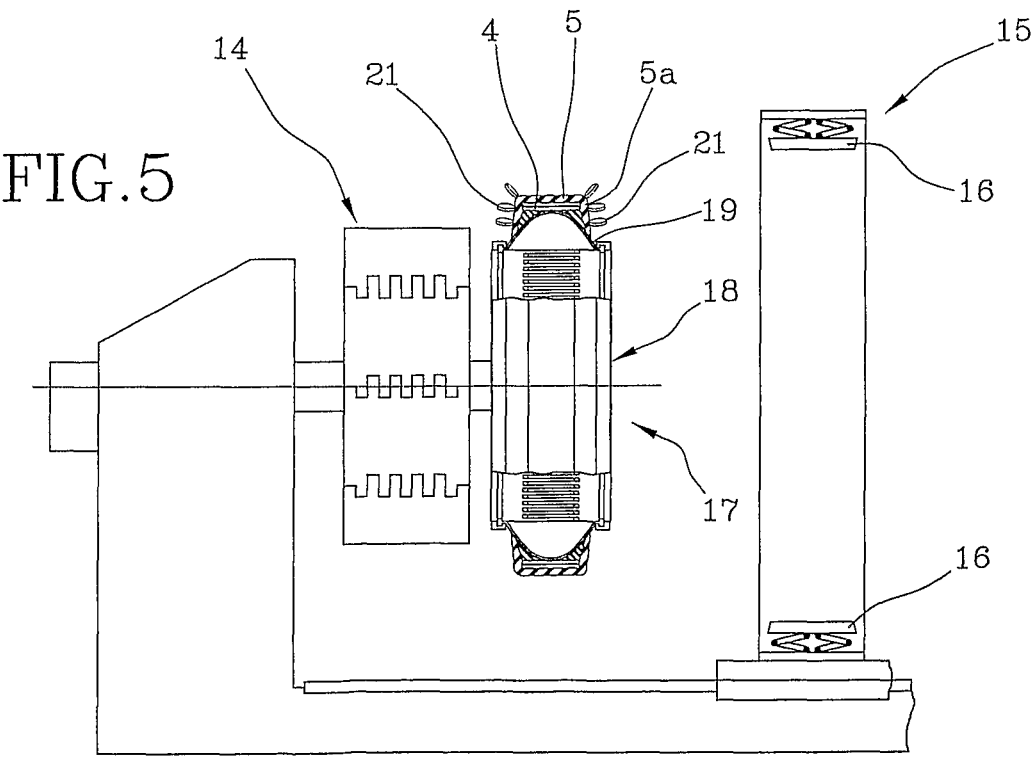
FIG. 5 shows the apparatus seen in the preceding figures during a rolling step of the tread band.

Apparatus 1 further comprises a transfer member 15 movable between the primary drum 13 and auxiliary drum 14 along the mutual alignment direction of same, to transfer the belt structure 4, together with the tread band 5 possibly applied thereto, onto the carcass structure 3 in the form of a cylindrical sleeve supported by the primary drum 13, as shown by way of example in FIG. 5.

For the purpose, the transfer member 15 can be provided, for example, with radially movable gripping elements 16 to pick up the belt structure 4 from the auxiliary drum 14 after possible radial contraction of the latter, and retain it in a coaxially centred position relative to the carcass structure 3 at the end of the translation to the primary drum 13.

In a manner known by itself, when the belt structure 4 is in a centred position relative to the carcass structure 3, two opposite halves 13a, 13b of the primary drum 13 retaining the carcass structure 3 at the respective annular anchoring structures 7 are axially moved close to each other simultaneously with admission of fluid into the carcass ply or plies 10, so as to shape the carcass structure 3 into a toroidal conformation.

The resulting radial expansion of the carcass ply 10 leads the latter to adhere against the inner surface of the belt structure 4, held by the transfer member 15.

While construction of the carcass structure 3 and the above described shaping step are both, in a preferential embodiment, carried out on the same primary drum 13, following a so-called "unistage" building process, it is also possible for the carcass structure 3 to be made on a distinct building drum separated from the primary drum 13, to be subsequently disposed on the primary drum itself that will perform the functions of a shaping drum following a building process of the so-called "two-stage" type.

In this case too, provision may be made for the tread band 5 to be obtained by spiraling of at least one elongated element of elastomer material, i.e. by winding a plurality of substantially circumferential coils of said elongated element, while said elongated element is supplied from an appropriate feeding unit, such as an extruder, at a radially external position to the belt structure, said belt structure being assembled on a tyre being processed which is shaped into a toroidal conformation by said shaping drum.

During spiraling, the tyre being processed goes on rotating on the shaping drum itself to allow occurrence of said winding, while a controlled axial movement of the tyre and/or of the unit supplying the elongated element causes distribution of the coils in a manner adapted to give the tread band 5 the desired final conformation.

Apparatus 1 further comprises devices for applying at least one underbelt insert 11 to the belt structure 4.

Advantageously, these application devices 17 operate close to the auxiliary drum 14, or in any case separately of the primary drum 13, to associate the underbelt inserts 11 with the belt structure 4 during assembling of the belt structure itself when the latter is still axially spaced apart from the carcass structure 3.

The application devices 17 comprise an expandable support 18 and actuator members to radially expand the expandable support between a first operating condition, at which it has a reduced diameter, and a second operating condition at which it has an increased diameter.

In more detail, the expandable support 18 preferably comprises an inflatable bladder 19 having opposite end flaps engaged, preferably in a sealing manner, along the circumferential edges of respective axially opposite attachment flanges 20 that are movable close to and away from each other. The inflatable bladder 19 can advantageously consist of a layer of vulcanised elastomer material incorporating textile or metallic reinforcing cords each extending between the opposite edges of the inflatable bladder 19, between one of the attachment flanges 20 and the other.

Preferably, the attachment flanges 20 are in mutual engagement by means of respective axial toothing sets 20a mutually conjugated and supplying a substantially continuous support seat for the inflatable bladder 19 when the expandable support is in the first operating condition. The axial toothing sets 20a are free to slide relative to each other to allow the flanges to axially move close to and away from each other.

Said actuator members, not shown in detail as they can be made in any convenient manner, are set to feed a fluid under pressure into the inflatable bladder 19, concurrently with movement of the attachment flanges 20 close to each other.

Alternatively, the expandable support 18 may comprise a drum of the mechanical type the cylindrical abutment surface of which has circumferentially distributed apertures through which radially movable sectors operate, being controlled by actuator members comprising appropriate lever articulated systems.

Associated with the expandable support 18 is a further feeding unit or equivalent devices operating close to the auxiliary drum 14 for winding of the underbelt insert or inserts 11 on the expandable support 18. As better shown in FIG. 3a, each underbelt insert 11 has a substantially triangular or trapezoidal cross-section outline, with a major side applied against the surface of the expandable support 18 and two minor (axially inner and axially outer, respectively) sides mutually converging radially away from the expandable support 18. The minor sides, the axially inner and axially outer one respectively, on the circumferential extension of the underbelt insert 11 respectively subtend the axially inner portion 11a arranged to be coupled with the belt structure 4 and the axially outer portion 11b, arranged to be coupled with the respective sidewall 6 of the tyre.

In accordance with an embodiment of the invention, the underbelt inserts can be applied to the expandable support 18 in the form of already structured and sized semifinished products, as shown in FIG. 3a.

Alternatively, each underbelt insert 11 can be made by spiraling at least one preferably continuous elongated element of elastomer material, i.e. by winding said elongated element supplied from an appropriate feeding unit such as an extruder into substantially circumferential coils. Winding takes place at a position radially external to the expandable support 18 continuously driven in rotation, while a controlled axial movement of the expandable support and/or the unit feeding the elongated element causes distribution of the coils in a manner adapted to give the underbelt insert 11 the desired final conformation.

As shown in FIGS. 2 and 7, the underbelt inserts 11 are simultaneously applied to the expandable support 18 when the latter is in the first operating condition of smaller diametrical bulkiness, with the inflatable bladder 19 substantially extended in a cylindrical conformation, in bearing relationship on the axial toothing sets 20a.

When application has been completed, radial expansion of the expandable support 18 is operated.

Figure 4:
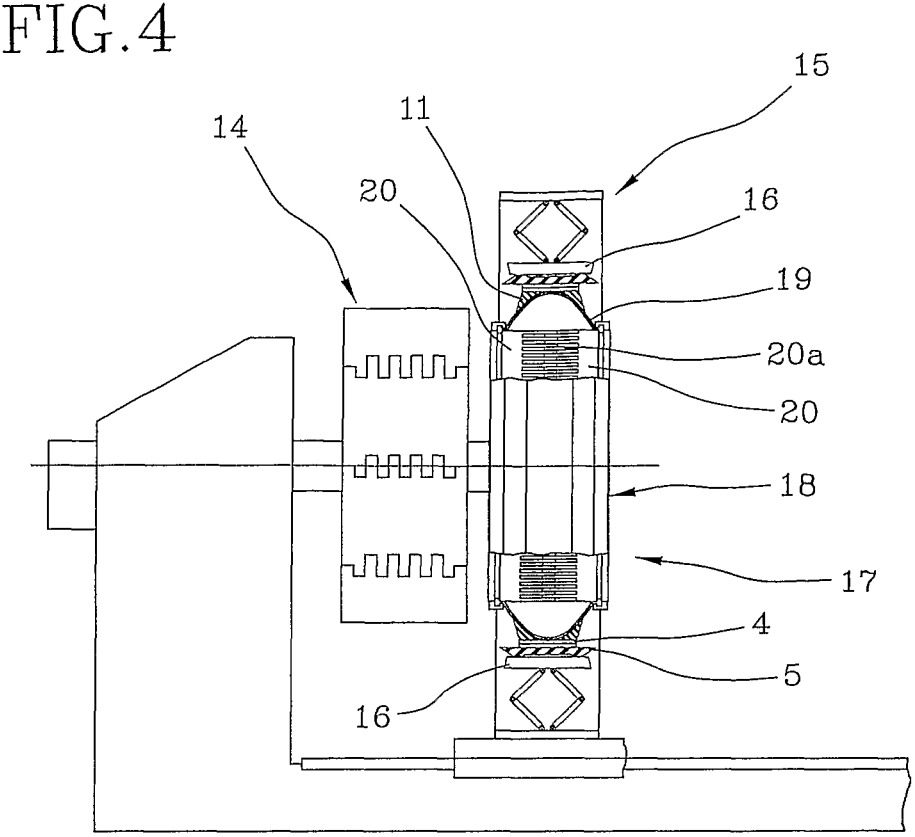
FIG. 4 shows application of the underbelt inserts to the belt structure.

For the purpose, the attachment flanges 20 are moved mutually close, concurrently with admission of fluid under pressure into the inflatable bladder 19 upon the action of said actuator members, so that the bladder takes a toroidal configuration, as shown in FIGS. 4 and 8.

To back up the radial expansion of the inflatable bladder 19, the underbelt inserts are submitted to elongation in the circumferential extension direction, due to an increase in diameter imposed to them.

Simultaneously, by effect of the expansion of the inflatable bladder until said bladder 19 takes a toroidal conformation, each of the underbelt inserts 11 is submitted to an angular rotation bringing its axially internal side of smaller extension defining the axially internal portion 11a, to take an orientation substantially parallel to the geometric axis of the expandable support 18.

In the embodiment shown in FIGS. 1 to 5, the expandable support 18 constitutes a component distinct from the auxiliary drum 14 and is located at a position axially spaced apart from the latter.

In this manner, application of the underbelt inserts 11 to the expandable support 18 can be advantageously carried out simultaneously with assembling of the belt structure 4 and possibly the tread band 5 on the auxiliary drum 14 (FIG. 2).

Figure 3:
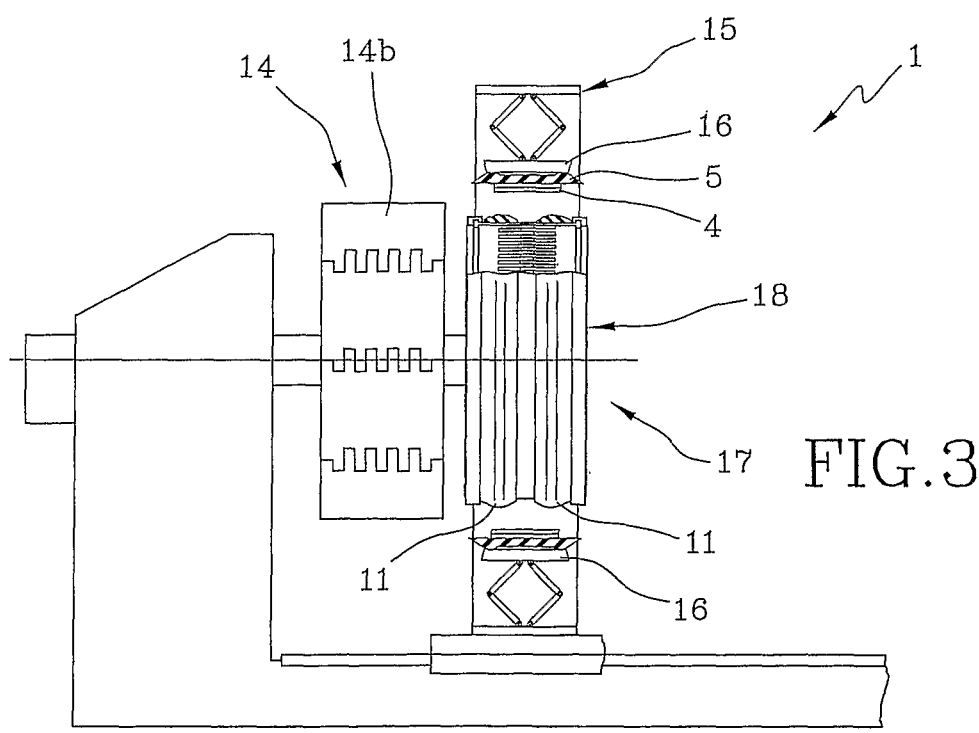
FIG. 3 diagrammatically shows the apparatus seen in the preceding figures during transfer of the belt structure to a position adapted for application of the underbelt inserts.

The belt structure 4, possibly provided with the tread band 5, formed on the auxiliary drum 14 is then picked up by the transfer device 15 and positioned in coaxial relationship around the expandable support 18 carrying the underbelt inserts 11, as viewed from FIG. 3.

Then intervention of the actuator members is operated, which members cause expansion of the expandable support 18, by effect of which mutual junction between the belt structure 4 and the underbelt inserts 11 takes place, as shown in FIG. 4.

Advantageously, at the end of the radial expansion and concurrently with said junction step, the underbelt inserts 11 have the respective axially inner portions disposed in an orientation substantially parallel to the inner surface of the belt structure 4, so as to obtain a uniform coupling between the underbelt inserts 11 and belt structure 4.

At the end of the radial expansion step, when the underbelt inserts 11 have already been associated with the belt structure 4, a step of pressing the belt structure 4 against the underbelt inserts 11 carried by the expandable support 18 can be executed, to ensure mutual adhesion between these components.

This operation can be carried out with the aid of rollers 21 or other suitable devices, that can directly act on the belt structure 4 or the tread band 5 applied to said belt structure; in the last-mentioned case a pressing effect of the tread band 5 against the belt structure 4 is also simultaneously obtained.

The presence of bending devices operating on the expandable support may be also provided, said devices being set to bend the side edges 5a of the tread band 5 to make them adhere against the respective axially outer portions 11b of the underbelt inserts 11 associated with the belt structure.

In more detail, these bending devices can be represented by the rollers 21 themselves or equivalent members used for pressing the belt structure 4 and/or tread band 5, that are axially and/or radially movable in accordance with the outline to be given to the tread band 5.

When the possible pressing and bending steps have been completed, the transfer member 15 picks up the belt structure 4, together with the underbelt inserts 11 and the tread band 5, from the expandable support 18 to transfer the assembly onto the primary drum 13, for assembling the same to the carcass structure 3 that has been meanwhile made or engaged thereon in any convenient manner. For the purpose, the halves 13a of the primary drum 13 are mutually approached simultaneously with admission of a fluid into the carcass ply 10, so as to shape the carcass structure into a toroidal configuration. The consequent radial expansion of the carcass ply 10 brings the latter to adhere against the inner surface of the belt structure 4, retained by the transfer member 15. By an optional final rolling step, the definitive application of the apices of the side edges 5a of the tread band 5 against the radially external ends of the sidewalls 6 is caused.

In the alternative embodiment shown in FIGS. 7 to 10, the expandable support 18 and auxiliary drum 14 are substantially integrated with each other. The abutment surface 14a of the auxiliary drum 14 is represented by the expandable support 18 itself, and more specifically by the outer surface of the inflatable bladder 19.

In this case, the assembling sequence of tyre 2 first contemplates application of the underbelt inserts 11 to the expandable support 18 set in the first operating condition, as shown in FIG. 7, and subsequently radial expansion of the support itself to prepare the underbelt inserts 11 for junction with the belt structure 4, as shown in FIG. 8.

This junction is carried out concurrently with assembling of the belt structure 4, carried out after the radial expansion step, through winding of the belt layer or layers 12a, 12b directly around the expandable support 18 set in the second operating condition, as shown in FIG. 9.

Subsequently application of the tread band 5 can be carried out, as well as the previously described optional pressing and bending steps (FIG. 10), to therefore give rise to transfer of the belt structure 4 together with the underbelt inserts 11 and tread band 5 to a coaxial position on the primary drum 13, on which the carcass structure 3 has been meanwhile made or engaged.

With the step of shaping the carcass structure 3 into a toroidal configuration and the optional final rolling step, manufacture of tyre 2 is completed following coupling between the carcass structure 3 and belt structure 4.

The present invention achieves important advantages.

Application of the underbelt inserts 11 to the belt structure 4 in fact enables times required for the operations to be carried out at the primary drum 13 and at the auxiliary drum 14 respectively, for tyre-manufacturing purposes, to be balanced.

As compared with the known art, in fact, the time required for application of the underbelt inserts 11, as well as for execution of at least part of the pressing and bending operations of the side edges 5a of the tread band 5 is subtracted from the working operations to be carried out on the primary drum 13. As a result, important advantages in terms of productivity of apparatus 1 are obtained.

In addition important advantages of the obtained product are achieved under a qualitative point of view.

In particular, the step of shaping the carcass structure 3 is not affected by the presence of the underbelt inserts 11 that, in the known art, can jeopardise a correct expansion of the carcass ply or plies 10.

Also eliminated is the risk of causing deformations and/or introducing inner tensions into the carcass structure 3, due to stresses imposed in the known art, during application of the underbelt inserts 11 to the carcass plies 10.

It is in fact to be noticed that, in the known art, the underbelt inserts 11 laid on the carcass structure 3 of cylindrical shape must be submitted, during the shaping step, to a percent elongation that can easily reach and overcome values in the order of 100%.

Stresses induced by this elongation can jeopardise a correct expansion of the carcass structure 3, causing localised thinning and/or upsetting of the cords.

The present invention eliminates all the above mentioned problems and also allows the underbelt inserts 11 to be laid on an expandable support 18 that, in the first operating condition, has a size closer to the final diameter under an expanded condition, so as to impose less deformations to the inserts.

Also the possibility of carrying out the actions of pressing and bending the end flaps of the tread band 5 before coupling of the latter with the carcass structure 3, enables distribution of the time for the operations carried out on the primary drum 13 and auxiliary drum 14 respectively to be optimised, depending on requirements, also avoiding the carcass being submitted to anomalous stresses that can cause undesirable deformations of said carcass.

It will be also appreciated that the invention can be also put into practice by suitably modifying already existing apparatus for tyre manufacture, without necessarily requiring a new planning and construction of the whole apparatus.

The invention claimed is:

1. A method of manufacturing tyres for vehicle wheels, comprising the steps of:
    disposing a carcass structure comprising at least one carcass ply on a primary drum;
    assembling a belt structure comprising at least one belt layer on an auxiliary drum;
    picking up the belt structure from the auxiliary drum;
    transferring the belt structure to a coaxially centered position relative to the carcass structure; and
    shaping the carcass structure into a toroidal configuration to engage the belt structure with the carcass structure,
    wherein a pair of sidewalls, each extending until close to a radially internal edge of the carcass structure, are laterally applied to the carcass structure on opposite sides,
    wherein the sidewalls are applied on the primary drum before shaping the carcass structure, and
    wherein during said step of assembling said belt structure, at least one underbelt insert is associated with said at least one belt layer at a radially internal position, by:
        applying said at least one underbelt insert onto an expandable support, said at least one underbelt insert having an axially internal portion tapering towards an equatorial plane of the tyre and an axially external portion;
radially expanding the expandable support; and
joining the at least one belt layer to said at least one underbelt insert,
wherein an angular rotation is imposed to said at least one underbelt insert concurrently with the radial-expansion step, whereby the axially internal portion is oriented substantially parallel to an inner surface of the belt structure and the axially external portion is oriented tapering towards a rotational axis of the tyre in consequence of said angular rotation.

2. The method as claimed in claim 1, wherein application of said at least one underbelt insert is carried out through spiraling of at least one elongated element of elastomer material on the expandable support.

3. The method as claimed in claim 1, wherein the step of assembling the belt structure on the auxiliary drum is carried out after said radial-expansion step and simultaneously with the joining step, through winding of said at least one belt layer around the expandable support carrying said at least one underbelt insert.

4. The method as claimed in claim 1, wherein, before the radial-expansion step, the belt structure picked up from the auxiliary drum is placed at a coaxially centered position relative to the expandable support.

5. The method as claimed in claim 4, wherein said joining step takes place through approaching between said at least one underbelt insert and the belt structure by effect of the radial-expansion step of the expandable support.

6. The method as claimed in claim 1, wherein, before said transferring step and after said associating step, a step of pressing the belt structure against said at least one underbelt insert carried by the expandable support is carried out.

7. The method as claimed in claim 1, further comprising the step of applying a tread band around the belt structure disposed on the auxiliary drum.

8. The method as claimed in claim 7, wherein said tread band is applied through spiraling of at least one elongated element of elastomer material.

9. The method as claimed in claim 7, wherein, before transfer of the belt structure, the step of bending the side edges of the tread band against axially external portions of said at least one underbelt insert coupled with the belt structure is carried out.

10. The method as claimed in claim 1, further comprising the step of applying a tread band at a radially external position to the belt structure that is assembled to the carcass structure shaped into a toroidal conformation, through spiraling of at least one elongated element of elastomer material.

11. The method as claimed in claim 1, wherein the step of laying the carcass ply is carried out through an operation involving winding of the ply around the primary drum.

12. An apparatus for manufacturing tyres for vehicle wheels comprising:
a primary drum set to support a carcass structure comprising at least one carcass ply and a pair of sidewalls, each laterally applied to the carcass structure on opposite sides and extending until close to a radially internal edge of the carcass structure;
devices for applying the sidewalls on the primary drum;
an auxiliary drum having an abutment surface set to support a belt structure;
a transfer member movable between the primary drum and auxiliary drum;
gripping devices associated with the transfer member to pick up the belt structure from the auxiliary drum; and
devices configured for application of at least one underbelt insert to said belt structure when the latter is at a position axially spaced apart from the carcass structure, the underbelt insert having an axially internal portion tapering towards an equatorial plane of the tyre and an axially external portion tapering towards a rotational axis of the tyre,
wherein said application devices comprise:
an expandable support comprising an inflatable bladder, wherein said inflatable bladder has opposite end flaps in engagement with respective axially-opposite attachment flanges;
actuator members to radially expand the expandable support between a first operating condition at which said support has a reduced diameter and a second operating condition at which said support has an increased diameter, wherein said attachment flanges are moved mutually close upon the action of the actuator members, so that the inflatable bladder takes a toroidal configuration; and
devices for winding of the underbelt inserts on the expandable support set in the first operating condition,
wherein said actuator members are configured to impose an angular rotation to said at least one underbelt insert concurrently with the radial expansion of the expandable support, whereby the axially internal portion is oriented substantially parallel to an inner surface of the belt structure and the axially external portion is oriented tapering towards a rotational axis of the tyre in consequence of said angular rotation.

13. The apparatus as claimed in claim 12, wherein said winding devices comprise at least one unit to feed an elongated element of elastomer material for application of said underbelt inserts through spiraling of said elongated element.

14. The apparatus as claimed in claim 12, wherein said actuator members are set to feed a fluid under pressure into the inflatable bladder.

15. The apparatus as claimed in claim 12, wherein said expandable support is laterally spaced apart from the auxiliary drum.

16. The apparatus as claimed in claim 12, wherein said expandable support defines the abutment surface of the auxiliary drum.

17. The apparatus as claimed in claim 12, further comprising pressing members operating on the expandable support to cause pressing of the belt structure against said at least one underbelt insert.

18. The apparatus as claimed in claim 12, further comprising devices for application of a tread band to the belt structure, at a radially external position.

19. The apparatus as claimed in claim 18, wherein said devices for application of the tread band operate on the auxiliary drum.

20. The apparatus as claimed in claim 19, wherein said devices for application of the tread band comprise a feeding unit to supply an elongated element of elastomer material for application of said tread band through spiraling of said elongated element.

21. The apparatus as claimed in claim 18, wherein said devices for application of the tread band operate on the primary drum.

22. The apparatus as claimed in claim 21, wherein said devices comprise a feeding unit to supply an elongated element of elastomer material for application of said tread band through spiraling of said elongated element.

23. The apparatus as claimed in claim 18, further comprising bending devices operating on the expandable support to bend end flaps of the tread band against axially external portions of said at least one underbelt insert associated with the belt structure.

* * * * *